(12) United States Patent
Miwa

(10) Patent No.: US 8,307,195 B2
(45) Date of Patent: Nov. 6, 2012

(54) INFORMATION PROCESSING DEVICE AND METHOD OF CONTROLLING INSTRUCTION FETCH

(75) Inventor: Hideyuki Miwa, Kawasaki (JP)

(73) Assignee: Renesas Electronics Corporation, Kanagawa (JP)

( * ) Notice: Subject to any disclaimer, the term of this patent is extended or adjusted under 35 U.S.C. 154(b) by 594 days.

(21) Appl. No.: 12/482,938

(22) Filed: Jun. 11, 2009

(65) Prior Publication Data

US 2010/0005276 A1    Jan. 7, 2010

(30) Foreign Application Priority Data

Jul. 2, 2008    (JP) ................. 2008-173410

(51) Int. Cl.
*G06F 9/30*    (2006.01)
*G06F 9/40*    (2006.01)
*G06F 15/00*    (2006.01)

(52) U.S. Cl. ...................................... 712/205

(58) Field of Classification Search ............. 712/205
See application file for complete search history.

(56) References Cited

U.S. PATENT DOCUMENTS 4,910,664 A * 3/1990 Arizono ................. 712/241

6,658,578 B1 * 12/2003 Laurenti et al. ............ 713/324

FOREIGN PATENT DOCUMENTS

| JP | 2004-030137 A | 1/2004 |
|---|---|---|
| JP | 2005-284814 A | 10/2005 |
| JP | 2007-207145 A | 8/2007 |

* cited by examiner

*Primary Examiner* — Corey S Faherty
(74) *Attorney, Agent, or Firm* — Sughrue Mion, PLLC

(57) ABSTRACT

An information processing device includes an instruction fetch unit, an instruction buffer, an instruction executing unit, and an instruction fetch control unit. The instruction fetch unit supplies a fetch address to an instruction memory. The instruction buffer stores an instruction read out from the instruction memory. The instruction executing unit decodes and executes the instruction supplied from the instruction buffer. The instruction fetch control unit stops supply of the fetch address to the instruction memory by the instruction fetch unit when the fetch address corresponds to a first address or an address after the first address while the instruction executing unit executes loop processing. The loop processing is repeatedly executed for a predetermined number of times in accordance with decoding of the loop instruction by the instruction executing unit. The first address is an address after an address of an end instruction included in the loop processing.

12 Claims, 6 Drawing Sheets

```
LOOP  16
NOP;
{
    INST1;   ◄──────── FIRST INSTRUCTION
                       (LOOP START INSTRUCTION)
    INST2;   ◄──────── SECOND INSTRUCTION
    INST3;   ◄──────── THIRD INSTRUCTION
                       (LOOP END INSTRUCTION)
}
INST4;       ◄──────── FOURTH INSTRUCTION  ⎫
INST5;       ◄──────── FIFTH INSTRUCTION   ⎬ SUCCESSIVE INSTRUCTIONS OUTSIDE LOOP
INST6;       ◄──────── SIXTH INSTRUCTION   ⎭
    :
```

Fig. 2

INFORMATION PROCESSING DEVICE AND METHOD OF CONTROLLING INSTRUCTION FETCH

BACKGROUND

1. Field of the Invention

The present invention relates to an information processing device such as a microprocessor, a DSP (Digital Signal Processor) or the like, and more particularly, to a control technique of instruction fetch with an information processing device.

2. Description of Related Art

An information processing device generally includes an instruction fetch unit that fetches an instruction from an instruction memory (instruction cache or ROM, for example), and an instruction executing unit that decodes the instruction that is fetched for execution. Further, in order to smoothly supply the instruction to the instruction executing unit, an instruction buffer is normally disposed between the instruction fetch unit and the instruction executing unit. In the information processing device having such a structure, the instruction fetch unit sequentially fetches the instructions independently from a pipeline processing after the instruction decoding in the instruction executing unit, and the instructions obtained from the instruction memory are stored in the instruction buffer. This precedent instruction fetch operation that is performed independently from processes after the instruction decoding is called instruction prefetch.

More specifically, the instruction fetch unit includes a fetch pointer which is a register to store an address of a fetch target instruction, and supplies a value of the fetch pointer to the instruction memory. The instruction fetch unit performs instruction fetch while sequentially updating the value of the fetch pointer in accordance with a data reading unit from the instruction memory. The data reading unit from the instruction memory can be rephrased as "a bus width between the instruction memory and the information processing device". Further, the instruction fetch unit includes a mechanism to discontinuously change the value of the fetch pointer to a branch destination address due to the occurrence of interruption, exception, decoding of a branch instruction or the like.

SUMMARY

However, the present inventors have found a problem as follows in the related information processing device described above. That is, when loop processing based on a loop instruction is executed, unnecessary instruction fetch operation is carried out for each loop. In the loop processing, a start instruction to an end instruction in a loop is repeated for a predetermined number of times. When the loop end instruction is decoded while the loop processing is executed, the fetch pointer is updated by an address of a loop start instruction to start the next loop. Further, the instructions after the loop end instruction that are already stored in the instruction buffer are invalidated. As the instruction fetch is the access processing to the cache memory, the unnecessary instruction fetch causes increase in power consumption.

By the way, Japanese Unexamined Patent Application Publication No. 2007-207145 discloses a technique of suspending the pipeline processing for subsequent instructions until when the execution of the loop instruction in an execution phase is completed when the information processing device having a pipeline structure decodes a loop instruction in a decode phase. This technique enables to prevent the execution of the instructions outside the loop subsequent to the loop end instruction before it is made possible to perform the loop termination judgment after the determination of the loop end address. However, Japanese Unexamined Patent Application Publication No. 2007-207145 does not disclose the technique of preventing unnecessary instruction fetch by the instruction fetch unit in the process of repeating the loop processing. As such, according to the information processing device disclosed in Japanese Unexamined Patent Application Publication No. 2007-207145, unnecessary instruction fetch is carried out to obtain the subsequent instructions outside the loop until when the loop end instruction is decoded.

A first exemplary aspect of the present invention is an information processing device including an instruction fetch unit, an instruction buffer, an instruction executing unit, and an instruction fetch control unit. The instruction fetch unit supplies a fetch address to an instruction memory. The instruction buffer stores an instruction read out from the instruction memory based on an address specified by the fetch address. The instruction executing unit decodes and executes the instruction supplied from the instruction buffer. The instruction fetch control unit stops supply of the fetch address to the instruction memory by the instruction fetch unit when the fetch address corresponds to a first address or an address after the first address while the instruction executing unit executes loop processing. The loop processing is repeatedly executed for a predetermined number of times in accordance with decoding of the loop instruction by the instruction executing unit. The first address is an address after an address of an end instruction included in the loop processing.

According to the information processing device of the first exemplary aspect of the present invention, the fetch of the subsequent instructions outside the loop may be suspended by comparing the fetch address with the first address regardless of whether the loop end instruction is decoded or not. As such, according to the information processing device of the first exemplary aspect of the present invention, it is possible to suppress unnecessary instruction fetch for the instructions outside the loop while the loop processing is being executed.

BRIEF DESCRIPTION OF THE DRAWINGS

The above and other exemplary aspects, advantages and features will be more apparent from the following description of certain exemplary embodiments taken in conjunction with the accompanying drawings, in which:

FIG. 2 is a diagram showing a program example including a loop instruction;

DETAILED DESCRIPTION OF THE EXEMPLARY EMBODIMENTS

The specific exemplary embodiments to which the present invention is applied will be described in detail with reference to the drawings. The same components throughout the drawings are denoted by the same reference symbols, and the overlapping description will be omitted as necessary for the sake of clarity.

<First Exemplary Embodiment>

Figure 1:
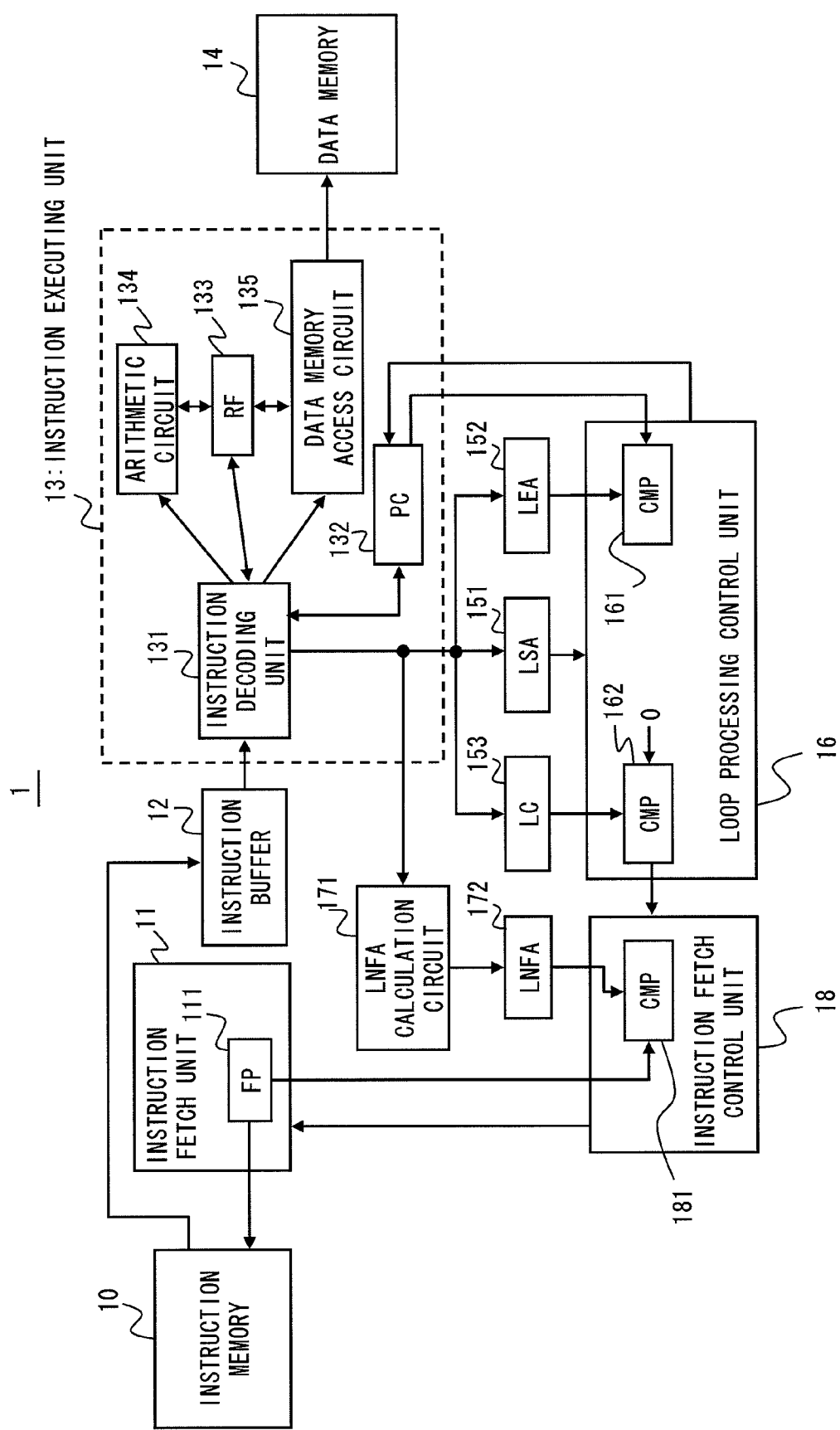
FIG. 1 is a block diagram of an information processing device according to a first exemplary embodiment of the present invention.

FIG. 1 shows the configuration of an information processing device 1 according to the first exemplary embodiment. In FIG. 1, an instruction memory 10 is a memory in which a program including an instruction group is stored. The instruction memory 10 is, for example, an instruction cache, a ROM (Read Only Memory), or a combination thereof.

An instruction fetch unit 11 fetches instructions from the instruction memory 10. Fetched instructions are stored in an instruction buffer 12. The instruction buffer 12 temporarily stores fetched instructions. The instruction memory 10, the instruction fetch unit 11, and the instruction buffer 12 are connected by an address bus (not shown) in which the fetch address is transferred and a data bus (not shown) in which instruction data read out from the instruction memory is transferred. The instruction fetch unit 11 outputs the fetch address held in a fetch pointer 111 to the address bus. In accordance with it, the instruction data that is read out from the instruction memory 10 is stored in the instruction buffer 12.

An instruction executing unit 13 decodes and executes an instruction. In the example of FIG. 1, the instruction executing unit 13 includes an instruction decoding unit 131, a program counter 132, a register file 133, an arithmetic circuit 134, and a data memory access circuit 135.

The instruction decoding unit 131 decodes the instruction obtained from the instruction buffer 12. Further, the instruction decoding unit 131 fetches an instruction operand from the register file 133. Furthermore, the instruction decoding unit 131 collaborates with a loop processing control unit 16 described later to control the execution of a loop processing based on a loop instruction when the decoded instruction is the loop instruction.

As shown in Japanese Unexamined Patent Application Publication No. 2007-207145, when the loop instruction is decoded in the instruction decoding unit 131, the pipeline processing for the subsequent instructions may be suspended until completion of execution of the loop instruction. Alternatively, instead of suspending the pipeline processing, a required number of NOP instructions may be arranged in a delay slot of the loop instruction.

The program counter 132 is a counter that indicates the instruction where the decoding is started in the instruction decoding unit 131, which is the instruction address that is being processed in the decode stage. When the instructions are sequentially executed, a value of the program counter 132 is updated by a value corresponding to an instruction length. When interruption occurs or when there is a branch instruction, the update is executed discontinuously by a branch destination address.

The register file 133 includes a plurality of registers. The register file 133 is used, for example, as a storage area of input/output data of the arithmetic circuit 134 described later, or as a storage area of a base address, an index address or the like for address operation by the data memory access circuit 135. Further, the register file 133 is used as a storage area of a program state that is being executed.

The arithmetic circuit 134 executes operation in accordance with the result of decoding the instruction by the instruction decoding unit 131. The arithmetic circuit 134 executes, for example, arithmetic operation and logical operation.

The data memory access circuit 135 performs data loading from the data memory 14 to the register file 133, and data storing to the data memory 14.

Subsequently, the components for controlling the execution of the loop processing will be described. An LSA (Loop Start Address) register 151 is a register that holds an address of a start instruction (hereinafter referred to as LSA) included in the loop processing. An LEA (Loop End Address) register 152 is a register that holds an address of an end instruction (hereinafter referred to as LEA) included in the loop processing. An LC (Loop Counter) register 153 is a register that holds the number of remaining loops. The value of the LC register 153 is decremented for each termination of one loop. Note that it is also possible to successively increment the LC register 153 to judge the loop termination as the number reaches a predetermined number.

The values of LSA, LEA, and LC that are required to control the loop processing are specified, for example, by the operand of the loop instruction. Further, a calculation circuit which is not shown may calculate LSA and LEA based on the information included in the operand (for example, offset value from the loop instruction address). Further, LSA may be determined based on the result of decoding the subsequent instructions after the loop instruction. For example, an address of the first instruction except an NOP (No Operation) instruction among the instructions that are subsequent to the loop instruction may be set as LSA.

The loop processing control unit 16 controls the execution of the loop processing based on the loop instruction. To be more specific, the loop processing control unit 16 compares LEA with the PC value held in the program counter 132, updates the program counter 132 for executing the next loop, decrements the LC register 153, and judges the loop termination based on the value of the LC register 153. A comparator 161 shown in FIG. 1 is a circuit that compares the PC value with LEA. Further, a comparator 162 is a circuit that compares the value of the LC register 153 with a preset value (zero, for example) for judging the loop termination.

Next, an LNFA calculation circuit 171, an LNFA register 172, and an instruction fetch control unit 18 will be described, which are components to perform stop control of the instruction fetch while the loop processing is being performed.

The LNFA calculation circuit 171 calculates an LNFA (Loop Next Fetch Address) based on the loop end instruction address LEA. LNFA here is an address of the subsequent instruction outside the loop, which is an address that is used to perform stop control of the instruction fetch by the instruction fetch control unit 18. The LNFA register 172 is a register that stores the LNFA that is calculated by the LNFA calculation circuit 171.

For example, the LNFA calculation circuit 171 may calculate the end address of a data block including the loop end instruction read out from the instruction memory 10 using the data bus width between the instruction memory 10 or the instruction buffer 12. Then, the LNFA calculation circuit 171 may set the end address or the subsequent addresses to LNFA. The LNFA is thus calculated because, when a superscalar configuration or a VLIW (Very Long Instruction Word) architecture is applied, the line width and the data bus width of the instruction memory 10 are made several times larger than the instruction length, and a plurality of instructions are concurrently fetched from the instruction memory 10. In other words, even the subsequent instructions outside the loop may be concurrently fetched with the loop end instruction.

The instruction fetch control unit 18 compares the value of the fetch pointer 111 with the fetch address held in the LNFA register 172, and stops the supply of the fetch address to the instruction memory 10 by the instruction fetch unit 11 when the fetch address is larger than or equal to the LNFA.

Note that the instruction fetch control unit 18 performs stop control of the instruction fetch only when the instruction executing unit 13 executes the loop processing based on the loop instruction. The judgment as to whether the loop processing is being performed may be made by the loop termination judgment by the loop processing control unit 16. For example, the instruction fetch control unit 18 may use the comparing result of the comparator 162.

In the following description, the specific effect of the instruction fetch stop control by the information processing device 1 according to the first exemplary embodiment will be described with a simple program example. FIG. 2 is a program example including a loop instruction. The instruction in the first row of FIG. 2 shown by mnemonic "LOOP 16" is the loop instruction. In the example of FIG. 2, the first operand of the loop instruction shows the number of loops.

The second row of FIG. 2 is an NOP instruction arranged in a delay slot of the loop instruction in the first row.

The instructions in the fourth to sixth rows (INST1 to INST3) in FIG. 2 are instructions inside the loop. In short, INST1 is a loop start instruction, and INST3 is a loop end instruction.

The instructions in the eighth to tenth rows (INST4 to INST6) in FIG. 2 are instructions outside the loop.

Figure 3A:
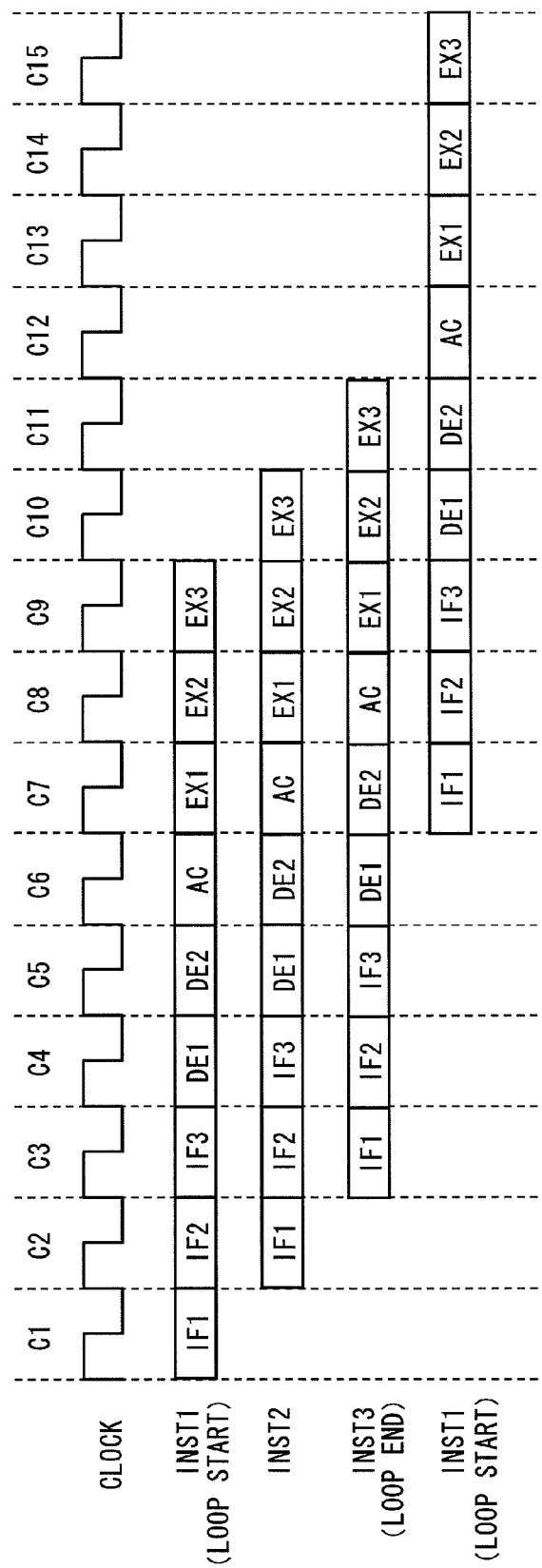
FIG. 3A is a diagram showing a pipeline processing of an instruction group regarding a loop processing by the information processing device of FIG. 1.
Figure 3B:
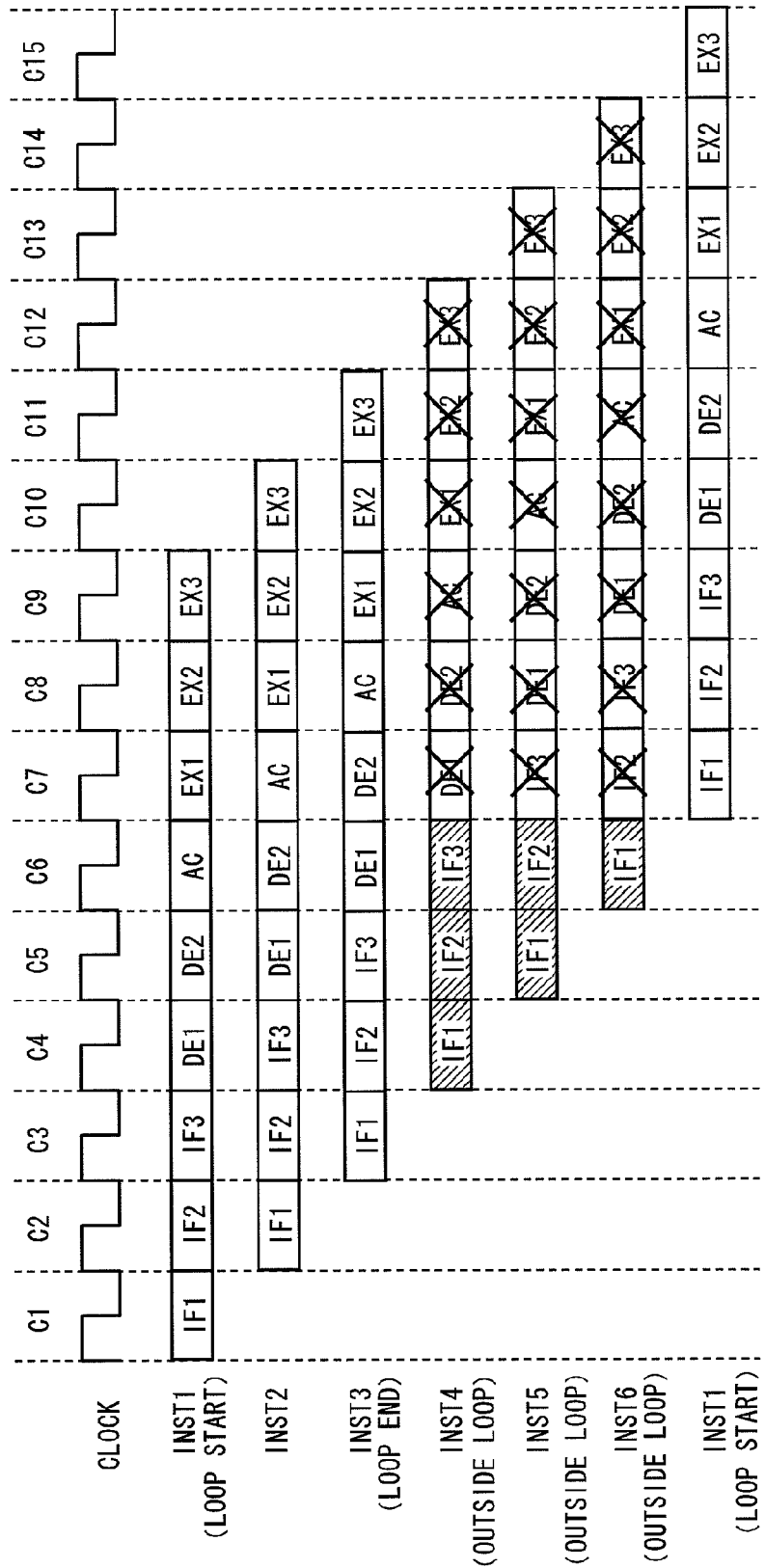
FIG. 3B is a comparison diagram showing a pipeline processing of an instruction group regarding a loop processing according to an information processing device of a related art.

Next, the difference of the instruction fetch operation between the information processing device 1 and the information processing device of the related art will be described with reference to pipeline diagrams of FIGS. 3A and 3B. FIG. 3A is a pipeline diagram when it is assumed that the information processing device 1 executes the program example shown in FIG. 2. On the other hand, FIG. 3B is a pipeline diagram when it is assumed that the information processing device according to the related art disclosed in Japanese Unexamined Patent Application Publication No. 2007-207145 executes the program example shown in FIG. 2. FIGS. 3A and 3B each shows a nine-stage pipeline. More specifically, three stages of IF1 to IF3 are instruction fetch stages. In the IF1 to IF3 stages, generation of a physical address in accordance with the fetch address, transfer of the fetch address (physical address) to the instruction memory 10, and instruction reading from the instruction memory 10 to the instruction buffer 12 and the like are performed.

DE1 and DE2 are instruction decode stages. In the stages of DE1 and DE2, the instruction decoding is performed by the instruction decoding unit 131.

AC is a register access stage, where the reading from the register file 133 is performed by the instruction decoding unit 131.

The three stages of EX1 to EX3 are execution stages. In the stages of EX1 to EX3, execution of operation by the arithmetic circuit 134 and write back to the register file 133 are carried out. Further, when the execution instruction is a load instruction or a store instruction, the access to the data memory 14 is performed by the data memory access circuit 135.

In the examples of FIGS. 3A and 3B, the loop end instruction (INST3) is decoded in a C6 cycle. Accordingly, when an additional mechanism such as a branch prediction or the like is not provided, the fetch of the loop start instruction (INST1) for the next loop is performed in a C6 cycle, or normally in a C7 cycle, as shown in FIGS. 3A and 3B.

In the information processing device of the related art as disclosed in Japanese Unexamined Patent Application Publication No. 2007-207145, the instruction fetch of the instructions INST4 to INST 6 outside the loop has already been performed at the point of the C6 cycle (stages shown by oblique lines in FIG. 3B). However, in the middle of the loop processing, the loop end instruction INST3 branches into the loop start instruction INST1. As such, the fetch of the instructions INST4 to INST 6 is unnecessary.

On the other hand, according to the information processing device 1, the instruction fetch control unit 18 stops the fetch of the instructions INST4 to INST 6 outside the loop. Accordingly, as shown in FIG. 3A, the fetch operation of the instruction INST4 to INST 6 outside the loop is not carried out.

As described above, as the information processing device 1 according to the first exemplary embodiment stops the instruction fetch of the addresses after LNFA while the loop processing is being executed, the unnecessary instruction fetch for the subsequent instructions outside the loop can be suppressed.

Further, as the information processing device 1 performs stop control of the instruction fetch based on the result of comparing LNFA with the fetch address held in the fetch pointer 111, the instruction fetch can be immediately stopped without waiting for the decoding result of the loop end instruction.

Further, the information processing device 1 calculates the end address of the data block including the loop end instruction read out from the instruction memory 10 using the data bus width between the instruction memory 10 and the instruction buffer 12, and determines LNFA with this calculation result. Accordingly, the normal fetch of the loop processing instruction by the instruction fetch unit 11 is not disturbed.

By the way, it has been described that the instruction fetch control unit 18 performs the stop control of the instruction fetch only when the instruction executing unit 13 performs the loop processing based on the loop instruction. However, the timing at which the instruction fetch control unit 18 starts the stop control of the instruction fetch does not necessarily match the start of the first loop processing. This is because, as the timing at which the stop control of the instruction fetch can be started depends on the timing of determining LEA and LNFA, the stop control of the instruction fetch is not necessarily executed from the first loop.

Further, the timing at which the instruction fetch control unit 18 terminates the stop control of the instruction fetch does not necessarily match the termination of the end loop. For example, the timing at which the stop control of the instruction fetch is terminated may be one loop before the end loop. After the termination of the end loop, the instruction outside the loop needs to be executed subsequent to the loop end instruction. Accordingly, the occurrence of the pipeline stall can be prevented by immediately performing the instruction fetch of the instruction outside the loop subsequent to the instruction fetch of the loop end instruction for the end loop.

<Second Exemplary Embodiment>

The information processing device 1 that is described above calculates LNFA using the loop end address LEA. The LNFA calculation circuit 171 described in the first exemplary embodiment may have difficulty in accurately calculating LNFA. For example, when the instruction has a variable length or when the instruction storage in the instruction memory 10 is not aligned with respect to a word boundary and a line boundary, it is difficult to predictively determine LNFA by calculation. In this case, the LNFA calculation circuit 171 sets a large value as LNFA, so as to be able to prevent the disturbance against the normal fetch of the loop end instruction. However, the unnecessary fetch of the several instructions outside the loop needs to be allowed. On the other hand, according to an information processing device 2 of the second exemplary embodiment, the result of executing the loop processing is observed, and LNFA is determined based on it. In the following description, the operation of determining LNFA will be described in detail, which is the difference between the information processing device 1 and the information processing device 2.

Figure 4:
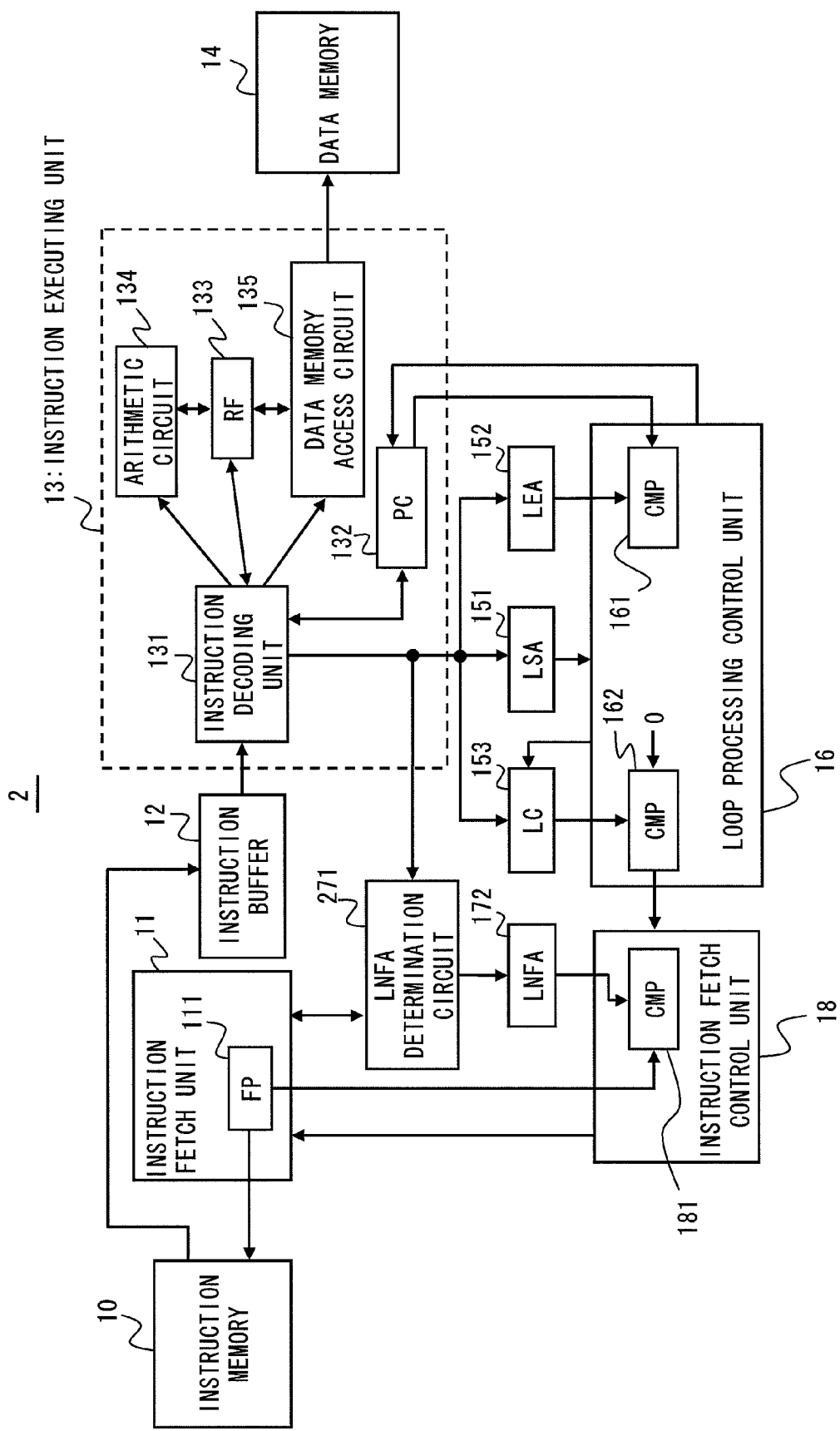
FIG. 4 is a block diagram of an information processing device according to a second exemplary embodiment of the present invention.

FIG. 4 shows the configuration of the information processing device 2. In FIG. 4, an LNFA determination circuit 271 obtains the end address of the data block including the loop end instruction read out from the instruction memory 10 when at least one loop based on the loop instruction is executed. Then, the LNFA determination circuit 271 set LNFA to the end address of the data block or an address after the end address of the data block. The LNFA which is determined is supplied to the instruction fetch control unit 18. In order to determine LNFA as soon as possible, the LNFA determination circuit 271 may determine LNFA in accordance with the result of executing the first loop.

Figure 5:
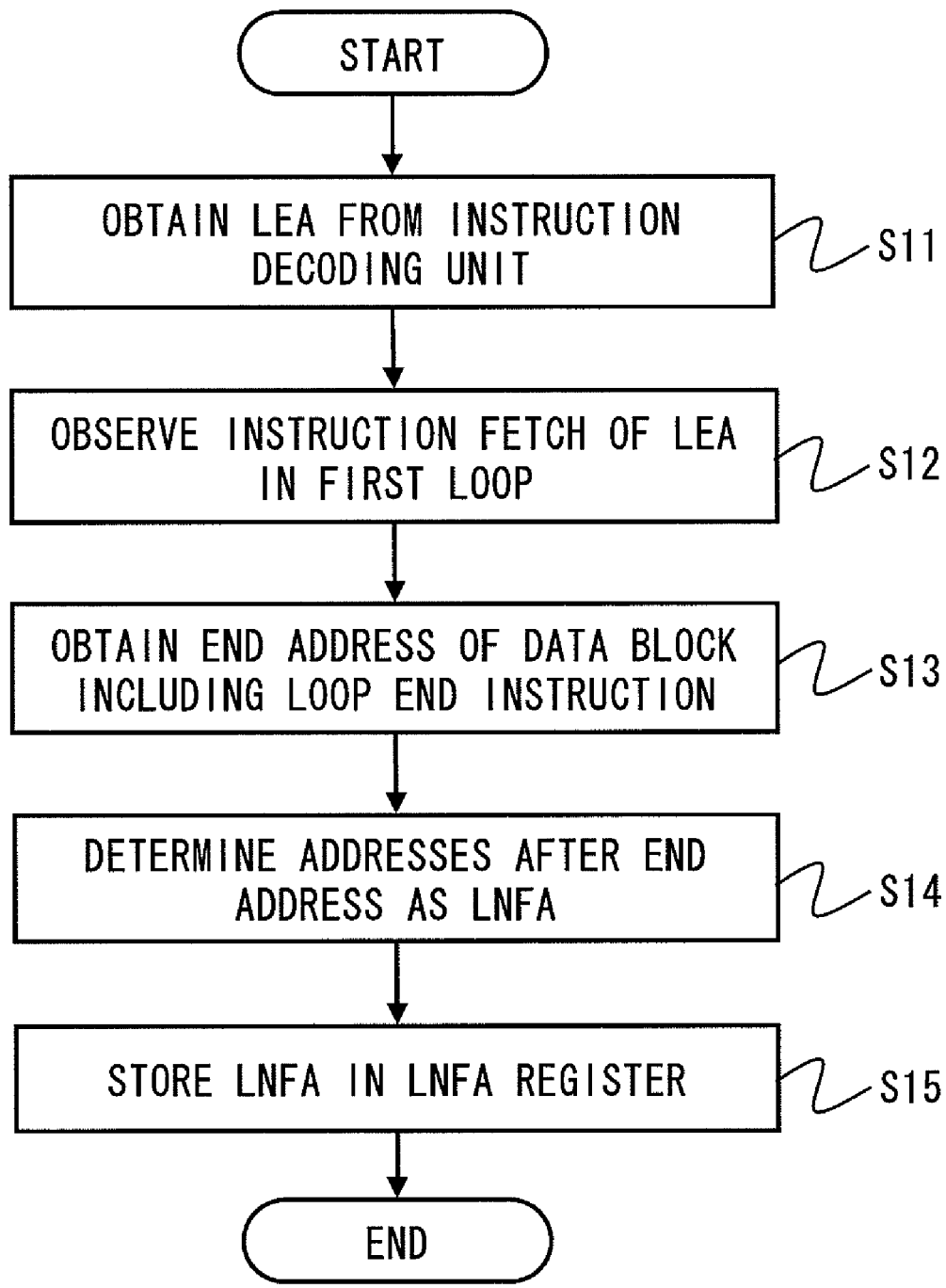
FIG. 5 is a flow chart showing a procedure for determining LNFA in the information processing device according to the second exemplary embodiment of the present invention.

FIG. 5 is a flow chart showing the operation example of the LNFA determination circuit 271. In step S11, the LNFA determination circuit 271 obtains the loop end instruction address LEA from the instruction decoding unit 131. In step S12, the instruction fetch of LEA in the first loop by the instruction fetch unit 11 is observed. In step S13, the end address of the data block including the loop end instruction is obtained from the instruction fetch unit 11. In step S14, the end address of the data block or an address after the end address of the data block is determined as LNFA. Lastly, in step S15, the LNFA that is determined is stored in the LNFA register 172.

As described above, the information processing device 2 according to the second exemplary embodiment observes the fetch operation of the loop end instruction when at least one loop processing is executed to determine LNFA. Accordingly, the information processing device 2 is able to perform stop control of the instruction fetch using the accurate LNFA based on the observation. Accordingly, even when it is difficult to predictively determine LNFA by calculation, the unnecessary fetch of the instruction outside the loop can be effectively suppressed.

<Other Exemplary Embodiments>

According to the information processing device 2 that is described above, the determination of LNFA is delayed, and thus, the stop control of the instruction fetch cannot be executed for at least one loop. In order to ameliorate it, the LNFA calculation circuit 171 included in the information processing device 1 described above may be added to the information processing device 2. According to this structure, for example, in the first loop, the stop control of the instruction fetch can be performed using LNFA calculated by the LNFA calculation circuit 171. Further, in the second loop and thereafter, the stop control of the instruction fetch can be performed using LNFA determined by the LNFA determination circuit 271.

Further, in order to immediately perform the fetch of the loop start instruction in returning to the loop start in the loop processing, a known branch prediction mechanism or a mechanism for supplying the loop start instruction disclosed in Japanese Unexamined Patent Application Publication No. 2005-284814 may be added to the information processing devices 1 and 2 described above.

While the invention has been described in terms of several exemplary embodiments, those skilled in the art will recognize that the invention can be practiced with various modifications within the spirit and scope of the appended claims and the invention is not limited to the examples described above.

Further, the scope of the claims is not limited by the exemplary embodiments described above.

Furthermore, it is noted that, Applicant's intent is to encompass equivalents of all claim elements, even if amended later during prosecution.

What is claimed is:

1. An information processing device comprising:
   an instruction fetch unit that supplies a fetch address to an instruction memory;
   an instruction buffer that stores an instruction read out from the instruction memory based on an address specified by the fetch address;
   an instruction executing unit that decodes and executes the instruction supplied from the instruction buffer;
   an instruction fetch control unit that stops supply of the fetch address to the instruction memory by the instruction fetch unit when the fetch address corresponds to a first address or an address after the first address while the instruction executing unit executes loop processing, the loop processing being executed based on a loop instruction in accordance with decoding of the loop instruction by the instruction executing unit; and
   an address determination circuit that determines the first address,
   wherein the address determination circuit obtains an end address of a data block read out from the instruction memory when at least one loop based on the loop instruction is executed and determines the end address or an address after the end address as the first address.

2. The information processing device according to claim 1, wherein the first address is the same address as the end address or the first address is the same address as the address after the end address of a data block including an end instruction that is read out from the instruction memory by an access to the instruction memory to fetch the end instruction.

3. The information processing device according to claim 1, further comprising an address calculation circuit that calculates the first address based on an address of an end instruction and a bus width between the instruction memory and the information processing device.

4. The information processing device according to claim 1, wherein
   the instruction fetch unit comprises an address register in which the fetch address is stored, and
   the instruction fetch control unit stops supply of the fetch address based on a result of comparing a value of the address register with the first address.

5. The information processing device according to claim 1, further comprising a loop counter that is incremented or decremented in accordance with the number of times of execution of the loop processing,
   wherein the instruction access control circuit judges termination of stop control of supply of the fetch address based on a value of the loop counter.

6. The information processing device according to claim 1, further comprising a loop processing control unit that controls execution of the loop processing when the instruction decoded by the instruction executing unit is the loop instruction,
   wherein the instruction access control circuit terminates stop control of supply of the fetch address in accordance with termination judgment of the loop processing by the loop processing control unit.

7. The information processing device according to claim 5, wherein the instruction access control circuit terminates the stop control of the supply of the fetch address while an instruction included in a last time of the loop processing is executed in the instruction executing unit.

8. A method of controlling instruction fetch in an information processing device, the method comprising:
   judging whether a fetch address which is an address of a target instruction of instruction fetch corresponds to a first address or an address after the first address while loop processing is executed, the loop processing being executed based on a loop instruction in accordance with decoding of the loop instruction
   obtaining an end address of a data block read out from an instruction memory when at least one loop based on the loop instruction is executed;
   determining the end address or an address after the end address as the first address; and
   stopping supply of the fetch address to the instruction memory when the fetch address is the address after the first address.

9. The method according to claim 8, wherein the first address is the same address as the end address or the first address is the same address as the address after the end address of a data block including an end instruction that is read out from the instruction memory by an access to the instruction memory to fetch the end instruction.

10. The method according to claim 8, comprising calculating the first address based on an address of an end instruction and a bus width between the instruction memory and the information processing device.

11. The method according to claim 8, further comprising terminating stop control of supply of the fetch address while an instruction included in a last time of the loop processing is executed.

12. The information processing device according to claim 1, wherein the instruction fetch control unit stops supply of the fetch address before decoding the end instruction included in the loop processing.

* * * * *